US011168663B2

(12) United States Patent
Danielsen et al.

(10) Patent No.: US 11,168,663 B2
(45) Date of Patent: Nov. 9, 2021

(54) BLADE PITCH SYSTEM INCLUDING POWER SOURCE FOR WIND TURBINE

(71) Applicant: General Electric Company, Schenectady, NY (US)

(72) Inventors: Darren John Danielsen, Simpsonville, SC (US); Jeffrey Alan Melius, Roanoke, VA (US); Parag Rameshchandra Dharmadhikari, Neufahrn b. Freising (DE); Ryan Michael Sunyak, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 79 days.

(21) Appl. No.: 15/629,879

(22) Filed: Jun. 22, 2017

(65) Prior Publication Data

US 2018/0372072 A1     Dec. 27, 2018

(51) Int. Cl.
*F03D 7/02* (2006.01)
*F03D 7/04* (2006.01)

(52) U.S. Cl.
CPC .......... *F03D 7/0224* (2013.01); *F03D 7/042* (2013.01); *F05B 2240/40* (2013.01);
(Continued)

(58) Field of Classification Search
CPC .... F03D 7/0224; F03D 7/042; F05B 2240/40; F05B 2260/76; F05B 2260/79
(Continued)

(56) References Cited

U.S. PATENT DOCUMENTS 7,642,748 B2 *   1/2010   Glosser, Jr. ........... H02J 7/0018
                                                               320/116
8,570,695 B2    10/2013   Shibuya et al.
(Continued)

FOREIGN PATENT DOCUMENTS

DE    10 2012 210010 A1    12/2013
JP         4233400 B2        3/2009
(Continued)

OTHER PUBLICATIONS

Chinese OA with Translation, dated Apr. 25, 2021.
(Continued)

*Primary Examiner* — Hal Kaplan
*Assistant Examiner* — Swarna N Chowdhuri
(74) *Attorney, Agent, or Firm* — Dority & Manning, P.A.

(57) ABSTRACT

Systems and methods for providing power to a blade pitch system in a wind turbine are provided. A blade pitch system can include one or more motors configured to pitch one or more blades of a wind turbine and a power source. The power source can include a plurality of energy storage devices coupled in series. The plurality of energy storage devices can be configured to provide power to the one or more motors during a power loss event. The power source can further include at least one bypass current device configured to allow a bypass current to provide power from at least one energy storage device to the one or more motors. The bypass current can be a current that bypasses one or more failed energy storage devices in the plurality of energy storage devices.

17 Claims, 8 Drawing Sheets

(52) U.S. Cl.
CPC ....... *F05B 2260/76* (2013.01); *F05B 2260/79* (2013.01); *F05B 2260/845* (2013.01); *F05B 2270/107* (2013.01); *F05B 2270/502* (2013.01); *F05B 2270/602* (2013.01); *F05D 2270/309* (2013.01); *Y02E 10/72* (2013.01)

(58) Field of Classification Search
USPC .......................................................... 307/64
See application file for complete search history.

(56) References Cited

U.S. PATENT DOCUMENTS

| | | | |
|---|---|---|---|
| 9,263,878 B2* | 2/2016 | Itou ........................ | H02H 3/202 |
| 2003/0116970 A1 | 6/2003 | Weitkamp et al. | |
| 2003/0227172 A1* | 12/2003 | Erdman .................. | F03D 7/048 |
| | | | 290/44 |
| 2004/0145188 A1* | 7/2004 | Janssen ................. | F03D 7/0224 |
| | | | 290/44 |
| 2007/0090797 A1* | 4/2007 | Glosser, Jr. ........... | H02J 7/0018 |
| | | | 320/116 |
| 2010/0158687 A1* | 6/2010 | Dawson .................. | F03D 7/024 |
| | | | 416/31 |
| 2013/0026989 A1 | 1/2013 | Gibbs et al. | |
| 2013/0193752 A1* | 8/2013 | Butzmann ............. | H02J 7/0016 |
| | | | 307/10.1 |
| 2014/0286776 A1* | 9/2014 | Gao ...................... | F03D 7/0224 |
| | | | 416/155 |
| 2015/0130421 A1 | 5/2015 | Bevilacqua, III | |
| 2015/0184634 A1* | 7/2015 | Shen ..................... | F03D 7/0224 |
| | | | 416/147 |

FOREIGN PATENT DOCUMENTS

| | | |
|---|---|---|
| KR | 101 486 733 B1 | 1/2015 |
| WO | WO 2007/132303 A1 | 11/2007 |

OTHER PUBLICATIONS

Extended European Search Report and Opinion issued in connection with corresponding EP Application No. 18178485.1 dated Nov. 12, 2018.
Indian Office Action, dated Sep. 16, 2021.

* cited by examiner

BLADE PITCH SYSTEM INCLUDING POWER SOURCE FOR WIND TURBINE

FIELD

The present disclosure relates generally to wind turbines, and more particularly to methods and systems for a providing power to one or more motors in a blade pitch system for a wind turbine during a power loss event.

BACKGROUND

Generally, a wind turbine includes a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into an electrical grid via at least one electrical connection. Gearless direct drive wind turbines also exist. The rotor, generator, gearbox and other components are typically mounted within a housing, or nacelle, that is positioned on top of a tower.

During operation of the wind turbine, however, grid disturbances may occur. For example, a voltage or current anomaly, such as a voltage drop, may occur when parts of an electrical grid experience a grid fault. In such an instance, the wind turbine may need to be electrically isolated from the grid. For example, one or more breakers or switches may need to be opened to electrically isolate the wind turbine from the electrical grid. The wind turbine may further need to be shut down so that the wind turbine does not continue to produce power.

When a wind turbine is shut down, the blades of the wind turbine may need to be pitched in order to feather the blades so that the wind does not mechanically rotate the blades. For example, one or more motors of a blade pitch system can mechanically pitch one or more blades on the wind turbine in order to feather the blades out of the wind. However, in a typical configuration, when a wind turbine is disconnected from the electrical grid, the blade pitch system may be unpowered, and therefore unable to pitch the blades. In some wind turbine systems, a backup power source may be configured to provide power to the one or more motors in the blade pitch system. However, when an energy storage device, such as a battery cell, fails in such a backup power source, the blade pitch system may fail and be unable to pitch the blades of the wind turbine.

BRIEF DESCRIPTION

Aspects and advantages of the invention will be set forth in part in the following description, or may be obvious from the description, or may be learned through practice of the invention.

One example aspect of the present disclosure is directed to a blade pitch system for a wind turbine. The wind turbine can include one or more blades. The blade pitch system can include one or more motors configured to pitch the one or more blades of the wind turbine. The blade pitch system can further include a power source. The power source can include a plurality of energy storage devices coupled in series. The plurality of energy storage devices can be configured to provide power to the one or more motors during a power loss event. The power source can further include at least one bypass current device configured to allow a bypass current to provide power from at least one energy storage device to the one or more motors. The bypass current can be a current that bypasses one or more failed energy storage devices in the plurality of energy storage devices.

Another example aspect of the present disclosure is directed a method for providing power to one or more motors of a blade pitch system to pitch one or more blades of a wind turbine. The method can include determining, by a control device, that a power loss event has occurred. The method can further include causing, by the control device, a power source to be electrically coupled to the one or more motors. The power source can include a plurality of energy storage devices coupled in series and at least one bypass current device coupled in parallel with at least one energy storage device. The method can further include determining, by the control device, that an energy storage device has failed. The method can further include controlling, by the control device, the bypass current device to allow a bypass current to bypass the failed energy storage device to provide power to the one or more motors.

Yet another example aspect of the present disclosure is directed to a wind turbine system. The wind turbine system can include a wind turbine comprising one or more blades. The wind turbine system can further include a blade pitch system. The blade pitch system can include one or more motors configured to pitch the one or more blades. The blade pitch system can further include a power source. The power source can include a plurality of energy storage devices coupled in series. The plurality of energy storage devices can be configured to provide power to the one or more motors during a power loss event. The power source can further include at least one bypass current device configured to allow a bypass current to provide power from at least one energy storage device to the one or more motors. The bypass current can be a current that bypasses one or more failed energy storage devices in the plurality of energy storage devices. The at least one bypass current device can be a diode, a MOSFET switching device, or an IGBT switching device.

Variations and modifications can be made to these example embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, example aspects of the present disclosure are directed to blade pitch systems and control methods for a blade pitch system in a wind turbine system. More particularly, a wind turbine system can include a wind turbine with one or more blades, and a blade pitch system. The blade pitch system can include one or more motors configured to pitch the one or more blades of the wind turbine. For example, in some implementations, each blade of a wind turbine can have an individual motor configured to pitch the blade. In some implementations, a single motor can be configured to pitch a plurality of blades, such as by rotating a gearing mechanism that pitches each blade on the wind turbine.

The blade pitch system can further include a power source (e.g., a backup power source). For example, a plurality of energy storage devices can be coupled in series. The energy storage devices can be, for example, batteries or supercapacitors. The energy storage devices can be configured to provide power to the one or more motors during a power loss event. For example, as used herein, the term "power loss event" can mean any instance in which a primary source of power is not provided to the blade pitch system. For example, during a grid fault, the wind turbine may be electrically isolated from an electrical grid, and therefore be unable to receive electrical power from the electrical grid.

The energy storage devices coupled in series will provide a stacked voltage, which can be used to power the one or more motors. However, when an energy storage device fails, the failed energy storage device may create an open circuit, thus not allowing any current to flow to the one or more motors.

According to example aspects of the present disclosure, the power source of the blade pitch system can further include at least one bypass current device configured to allow a bypass current device to provide power from at least one energy storage device to the one or more motors. For example, the bypass current device can be a diode, a power diode, a Zener diode, or a switching device, such as an IGBT or MOSFET switching device. The bypass current can be a current that bypasses one or more failed energy storage devices in the plurality of energy storage devices, thereby allowing the one or more motors to pitch the one or more blades of the wind turbine.

In some implementations, the blade pitch system can include a plurality of bypass current devices, and each energy storage device can have a bypass current device coupled in parallel with the respective energy storage device. In some implementations, a bypass current device can be coupled in parallel with a plurality of energy storage devices.

For example, one or more power diodes can be positioned in parallel with one or more energy storage devices. During normal operation, the one or more power diodes will prevent a current from flowing through them. However, when an energy storage device fails open or with a high resistance, a reversed voltage will be impressed on the failed energy storage device due to the other energy storage devices in the system. The reversed voltage will cause the power diode to conduct, thereby limiting the reversed voltage on the failed energy storage device. Further, as the power diode conducts, the bypass current can flow to other downstream energy storage devices, completing the electrical circuit. In this way, the bypass current can flow through the bypass current device to complete the circuit to provide power to the one or more motors in the blade pitch system.

In some implementations, the bypass current device can be a switching device, such as a semiconductor switching device (e.g., MOSFET or IGBT switching device). For example, a control device can be configured to determine that an energy storage device has failed. In some implementations, the control device can be configured to determine that an energy storage device has failed based at least in part on a voltage across the bypass current device. For example, a voltage across the bypass current device (e.g., diode, IGBT or MOSFET) can be measured, and when the voltage becomes reversed or dips below a threshold voltage, the control device can be configured to determine that a corresponding energy storage device has failed. The control device can further be configured to control the switching device to allow the bypass current to bypass the failed energy storage device. In this way, the bypass current can flow through the bypass current device to complete the circuit to provide power to the one or more motors in the blade pitch system.

In some implementations, the control device can further be configured to provide an alert for scheduled maintenance to be performed on the failed energy storage device. For example, after determining that an energy storage device has failed, the control device can be configured to provide an output to a computing system, a display, or other output which can alert a technician that an energy storage device has failed. In some implementations, the specific failed energy storage device can be identified. A technician can then replace the failed energy storage device.

As noted, the bypass current device can be positioned in parallel with at least one energy storage device. In some implementations, a bypass current device can be positioned in parallel with a plurality of energy storage devices. For example, two or more energy storage devices can be coupled in series, and the bypass current device can be positioned in parallel with the two or more energy storage devices.

In some implementations, the blade pitch system can further include a fuse coupled between at least one energy storage device in the plurality and the bypass current device. The bypass current can flow through the fuse. For example, each energy storage device can include a plurality of nodes, a first node (e.g., a node at a first voltage) and a second node (e.g., a node at a second voltage) when two energy storage devices are coupled in series, a first node of a first energy storage device can be coupled to a second node of a second energy storage device. In some implementations, a fuse can be coupled at node where the two energy storage devices are coupled together. In some implementations, a fuse can be coupled to only a single node of an energy storage device, such as at the ends of a string of energy storage devices coupled in series.

The fuse can further be coupled to a bypass current device. For example, a bypass current device can have a first node on one end of the bypass current device, and a second node on the other end of the bypass current device. In some implementations, a plurality of bypass current devices can be coupled in series, with each bypass current device in parallel with one or more energy storage devices. In some implementations, the fuse can be coupled to a node between two bypass current devices. In some implementations, a fuse can be coupled to only a single node of a bypass current device, such as at the end of a string of bypass current devices coupled in series.

In some implementations, the fuse can be configured to protect against a short circuit in a bypass current device for an incorrectly installed bypass current device. For example, should a bypass current device (e.g., power diode) short, a short circuit can be created across the bypass current device, allowing for a very high current to flow through the bypass current device. A fuse can be configured to protect against a short by, for example, being sized such that the fuse burns up when the short circuit begins flowing. Similarly, a fuse can be configured to protect against an incorrectly installed bypass current device. For example, should a power diode be installed backwards, in a normal operating mode, the voltage across the power diode would cause a very high current to flow. The fuse can be configured to protect against the incorrectly installed bypass current device by, for example, being sized such as the fuse burns up when the high current begins flowing.

In some implementations, a fuse can be configured to protect a plurality of energy storage devices. For example, a bypass current device can be installed in parallel with a plurality of energy storage devices. The fuse can be coupled between at least one of the energy storage devices and the bypass current device. In some implementations, the blade pitch system can include a plurality of fuses, and each fuse can be coupled between at least one energy storage device and at least one bypass current device coupled in parallel with the respective energy storage device(s).

In this way, the systems and methods according to example aspects of the present disclosure can have a technical effect of allowing for a bypass current to flow through a bypass current device, thereby bypassing a failed energy storage device in a power source of a blade pitch system. This can allow the power source to provide power to one or more motors of the blade pitch system in order to allow operation of the blade pitch system in the event of a failed energy storage device during a power loss event.

Further, the systems and methods according to example aspects of the present disclosure can allow for detecting a failed energy storage device, and further alerting a technician that maintenance needs to be performed on the failed energy storage device. This can increase the reliability of a blade pitch system, and help to ensure that the blade pitch system is available in the event of a power loss event.

Additionally, the systems and methods according to example aspects of the present disclosure can protect against short circuits and incorrectly installed components, thereby improving safety for a technician who may work on the blade pitch system.

Figure 1:
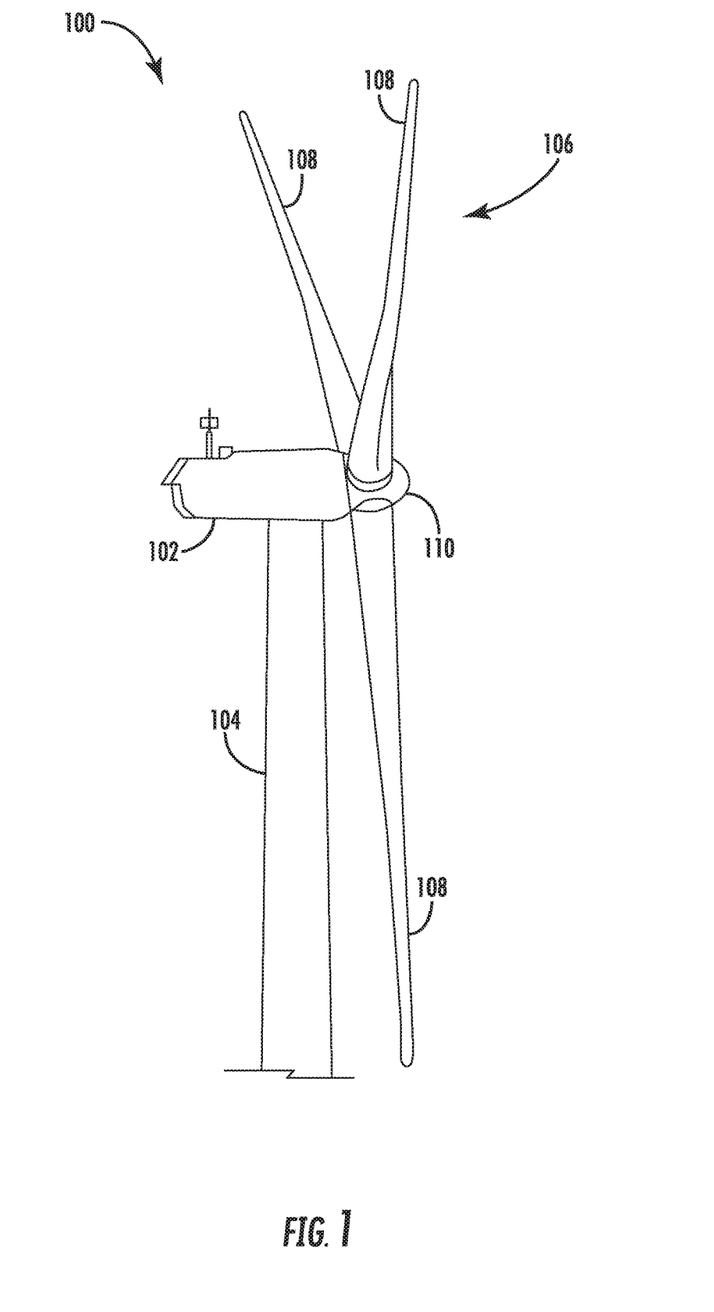
FIG. 1 depicts a perspective view of a portion of a wind turbine according to example aspects of the present disclosure.

With reference now to the FIGS., example embodiments of the present disclosure will now be discussed in detail. FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitate operation of wind turbine 100 as described herein. Blades 108 may be pitched along an axis of each blade 108. For example, each blade 108 may be pitched to feather the blade 108 into or out of the wind. In some implementations, blades 108 can be pitched by a blade pitch system (not shown in FIG. 1) operatively coupled to blades 108.

Figure 2:
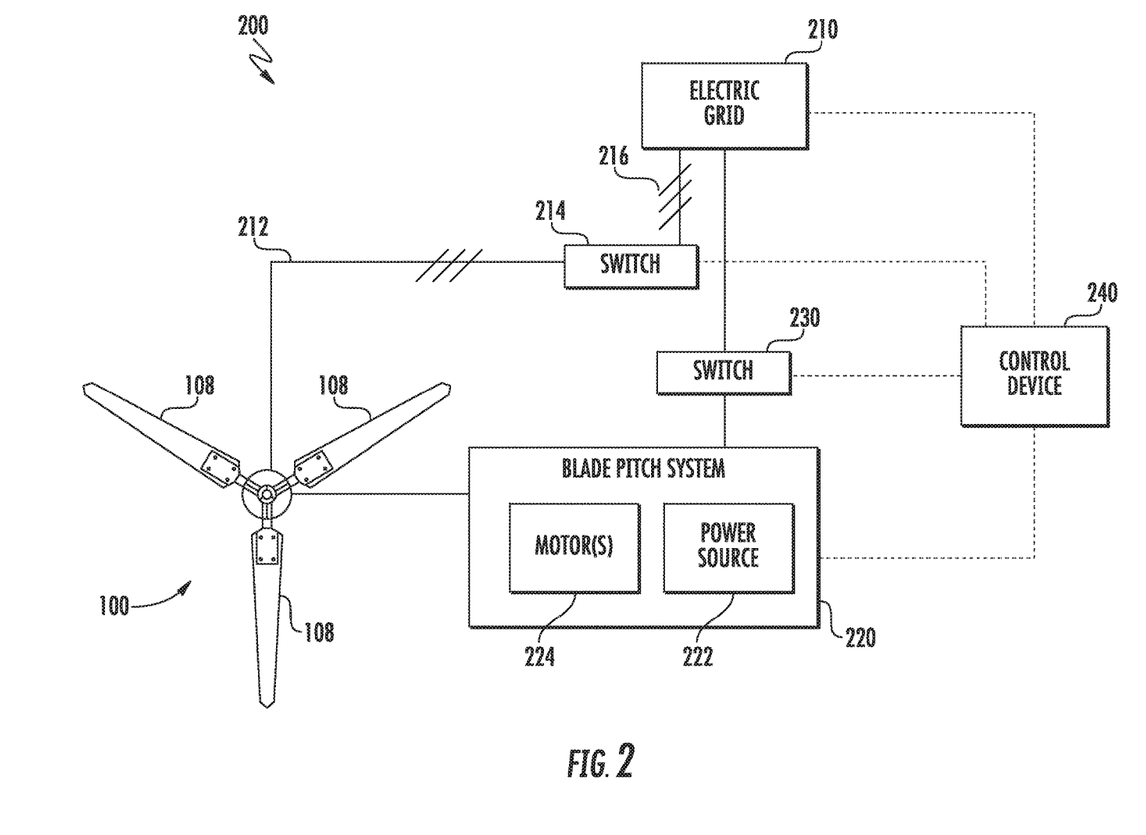
FIG. 2 depicts a schematic view of wind turbine system including a blade pitch system according to example aspects of the present disclosure.

FIG. 2 is a schematic view of an exemplary wind turbine system 200 that may be used with wind turbine 100. Wind turbine system 200 can include a wind turbine 100, which can include one or more blades 108. Wind turbine 100 can be coupled to an electric grid 210. Power generated by wind turbine 100 can be provided to a turbine bus 212. In some implementations, the power generated by wind turbine 100 can be a multi-phase (e.g., three-phase) power. In some implementations, a switch/breaker 214 can be used to selectively couple wind turbine 100 to electric grid 210 by coupling turbine bus 212 to grid bus 216.

Wind turbine system 200 can further include a blade pitch system 220. Blade pitch system 220 can include a power source 222 and one or more motors 224. The one or more motors 224 can pitch one or more blades 108 of the wind turbine 100. In some implementations, a single motor 224 can pitch a plurality of blades 108, such as all blades 108. In some implementations, each blade 108 can be pitched by a respective motor 224. The one or more motors 224 can be used to pitch the blades 108 during a power loss event, such as a grid fault. For example, when a grid fault occurs requiring the wind turbine 100 to be electrically isolated from the electric grid 210, the one or more motors 224 can be used to feather the blades 108 out of the wind. Similarly, a power loss event for a primary power source for a blade pitch system 220 may occur, such as when a fault between an electrical grid 210 and a blade pitch system 220 occurs. The one or more motors can be powered during the power loss event by the power source 222.

Power source 222 can be used to provide power to the one or more motors 224. For example, power source 222 can include a plurality of energy storage devices, as described herein. Energy stored in the energy storage devices can be provided to the one or more motors 224 in order to pitch the blades 108. For example, as described in greater detail with respect to FIGS. 3-13, energy stored in the energy storage devices can be provided to the one or more motors 224 when a primary source of power is not available, such as during a power loss event.

In some implementations, blade pitch system 220 can be coupled to electric grid 210. For example, power from electric grid can be provided to the blade pitch system 220 and stored in the power source 222. In some implementations, the blade pitch system 220 can be selectively coupled to the electric grid 210 by a switch 230.

Wind turbine system 200 can further include a control device 240. Control device 240 can be configured to control the blade pitch system 220 to pitch the blades 108. For example, in some implementations, control device 240 can electrically couple power source 222 to the one or more motors 224 to provide power to the one or more motors 224. In some implementations, control device 240 can be configured to determine that a power loss event has occurred. For example, the control device 240 can be configured to receive one or more signals indicative of a grid disturbance, such as from one or more voltage sensors or current sensors coupled to electric grid 210. Similarly, the control device 240 can be configured to determine that a power loss event in a primary source of power for a blade pitch system 220 has occurred. In some implementations, the control device can determine that a power loss event has occurred by detecting a voltage or current anomaly of the electric grid 210.

In some implementations, control device 240 can be configured to determine that an energy storage device in a power source 222 has failed. For example, control device 240 can be configured to detect a voltage across a bypass current device in a power source 222. In some implementations, the control device 240 can be configured to determine that an energy storage device in a power source 222 has failed based at least in part on a voltage across a bypass current device in the power source 222, as described herein.

In some implementations, a control device 240 can further provide an alert for scheduled maintenance to be performed on a failed energy storage device. For example, control device 240 can be configured to provide an output to a computing system, a display, or other output which can alert a technician that an energy storage device has failed. In some implementations, the specific failed energy storage device can be identified. A technician can then replace the failed energy storage device.

In some implementations, control device 240 can be configured to control a switching device in a power source 222. For example, power source 222 can include one or more IGBT or MOSFET switching devices as bypass current devices. In some implementations, control device 240 can be configured to control the MOSFET or IGBT switching devices to allow the bypass current to bypass a failed energy storage device.

Wind turbine system 200 can further include additional elements, such as transformers, power converters, switches, breakers, system protection devices, or other elements to provide the functionality described herein. For example, transformers can transform power from a first voltage to a second voltage, and power converters can convert power from AC power to DC power, as needed.

Figure 3:
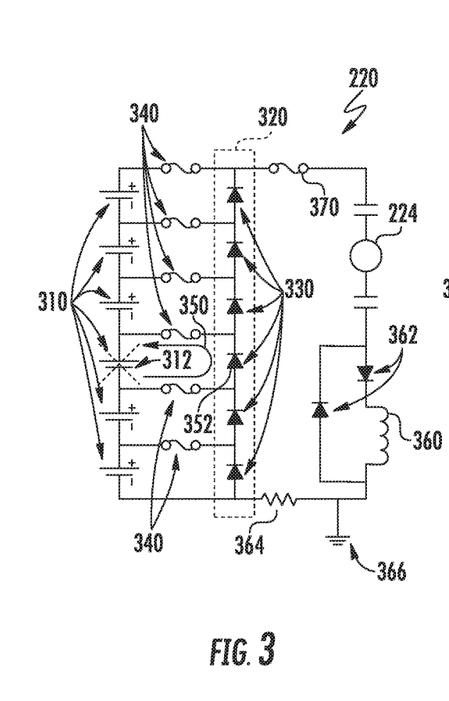
FIG. 3 depicts a blade pitch system according to example aspects of the present disclosure.

Referring now to FIG. 3, an example blade pitch system 220 according to example aspects of the present disclosure is depicted. As shown, blade pitch system 220 can include a plurality of energy storage devices 310 coupled in series. The energy storage devices 310 can be, for example, batteries or supercapacitors. The energy storage devices can further be configured to provide power to one or more motors 224 in order to pitch one or more blades 108.

In some implementations, the energy storage devices 310 can be coupled to the motor 224 by a control device 240 (not shown). For example, a control device 240 can close one or more switches (not shown) in order to couple the energy storage devices 310 to the motor 224.

The blade pitch system 220 can further include one or more bypass current devices 320. The bypass current devices can be configured to allow a bypass current to bypass one or more failed energy storage devices 310. For example, when an energy storage device 310 in the plurality of energy storage devices 310 coupled in series fails, the failed energy storage device can create an open circuit, which can prevent a current from flowing from the energy storage devices 310 to the one or more motors 224. The bypass current device(s) 320 can allow it bypass current to bypass the one or more failed energy storage devices 310 in the plurality of energy storage devices 310.

For example, as shown in FIG. 3, the bypass current device(s) can be power diodes 330. In some implementations, a power diode 330 can be coupled in parallel with at least one energy storage device 310. In some implementations, each energy storage device 310 can have a power diode 330 coupled in parallel with the respective energy storage device 310. In some implementations, a power diode can be coupled in parallel with a plurality of energy storage devices 310. When an energy storage device 310 fails, an open circuit or high resistance can be created. In such a case, a reversed voltage or voltage below a threshold may be impressed on the failed energy storage device 210 due to the other energy storage devices 310 in the blade pitch system 220. For example, a reversed voltage can be a negative voltage, or a voltage below a threshold voltage. When the reversed voltage occurs, a corresponding power diode 330 coupled in parallel can conduct. For example, as shown in FIG. 3, a failed energy storage device 312 can create an open circuit in the series-connected energy storage devices 310. The failed energy storage device 312 can create a reversed voltage (e.g., a negative, zero, or voltage below a threshold) across a corresponding power diode 332, thereby allowing a bypass current 350 to bypass the failed energy storage device 312. In this way, the bypass current 350 can bypass the failed energy storage device 312, thereby allowing power from the energy storage devices 310 to be provided to the one or more motors 224.

In some implementations, one or more fuses 340 can be coupled between the at least one energy storage device 310 in the plurality of energy storage devices 310 and a bypass current device 320. In some implementations, a plurality of fuses 340 can be included in a blade pitch system 220, wherein each fuse 340 is coupled between at least one energy storage device 310 and at least one bypass current device 320 coupled in parallel with the at least one energy storage device 310. For example, as shown in FIG. 3, each energy storage device 310 can include a first node (e.g., a − node) and a second node (e.g., a + node). A fuse 340 can be coupled to the second node of each energy storage device 210 and a bypass current device 320. In some implementations, each fuse 340 can be configured to protect against a short circuit in a bypass current device 320 or an incorrectly installed bypass current device 320. as described herein.

The blade pitch system 220 can further include system protection elements, such as a fuse 370 and an inductor loop comprising an inductor 360 and two inductor diodes 362 coupled to the one or more motors 224. In some implementations, a shunt resistor 364 can be coupled to an energy storage device 310 in the plurality of energy storage devices, as shown in FIG. 3. In some implementations, a ground 366 can also be included in the blade pitch system 220.

Figure 4:
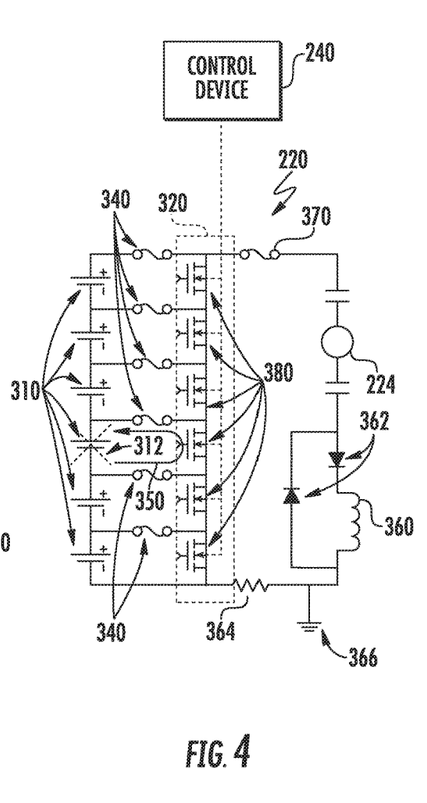
FIG. 4 depicts a problem addressed by a blade pitch system according to example aspects of the present disclosure.

Referring now to FIG. 4, a blade pitch system 220 according to additional aspects of the present disclosure is depicted. Elements that are the same or similar to those as in FIG. 3 are referred to with the same reference numerals. As shown, a blade pitch system 220 can further include a control device, such as a control device 240. Additionally, the bypass current device 320 can be a switching device 380, such as an IGBT or MOSFET switching device 380.

In some implementations, the control device 240 can be configured to determine that an energy storage device 310 has failed. For example, a control device 240 can be configured to detect a voltage across a bypass current device 320, such as a switching device 380. The control device 240 can be configured to determine that an energy storage device 310 has failed based at least in part on a voltage across the bypass current device 320.

Further, the control device 240 can be configured to control a switching device 380 to allow a bypass current 350 to bypass a failed energy storage device 312. For example, the control device 240 can detect that an energy storage device 310 is a failed energy storage device 312 based at least in part on a voltage across a bypass current device 320 (e.g., switching device 382). The control device 240 can further control the corresponding bypass current device 320 (e.g., switching device 382) to allow the bypass current device 250 to flow to allow the bypass current 350 to bypass the failed energy storage device 312. For example, the control device 240 can send a control signal to close the switching device 382 to allow the bypass current 350 to flow. In this way, the control device 240 can be configured to determine that an energy storage device 310 has failed, and further control a switching device 310 to allow a bypass current 350 to bypass the failed energy storage device 312.

Figure 5:
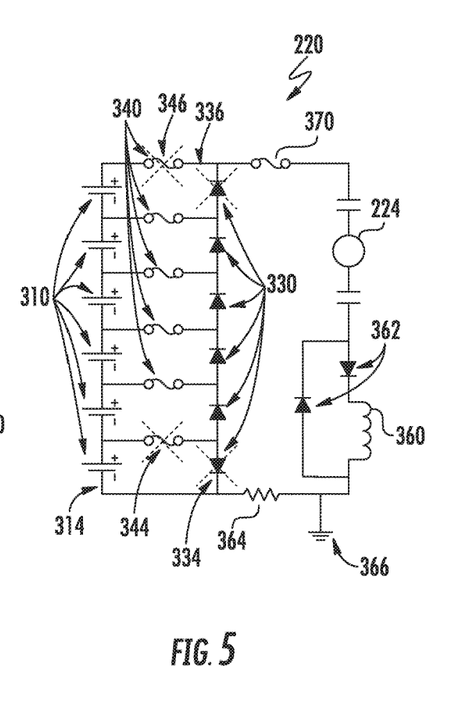
FIG. 5 depicts a blade pitch system according to example aspects of the present disclosure.

Referring now to FIG. 5, an example benefit provided by the inclusion of one or more fuses 340 is depicted. Elements that are the same or similar to those as in FIGS. 3 and 4 are referred to with the same reference numerals. As shown, Power diode 334 has been incorrectly installed in the blade pitch system 220. For example, power diode 334 is installed backwards. In such a situation, power diode 334 will allow a very high current to flow during normal operation of the corresponding energy storage device 314. Fuse 334 can be configured to protect against the incorrectly installed bypass current device by, for example, being sized such that fuse 344 will blow in the event of a high current flowing through incorrectly installed power diode 334.

Similarly, power diode 336 has short-circuited. In such a situation, a high current can flow through fuse 346. Fuse 346 can be configured to protect against a short circuit in the power diode 336 by, for example, being sized such that fuse 346 will blow in the event of a high current flowing through the short-circuited power diode 336.

In this way, the fuses 340 can provide protection for the blade pitch system 220, and can allow for safer operation of the blade pitch system 220 such as, for example, when a technician perform service on the blade pitch system 220.

Figure 6:
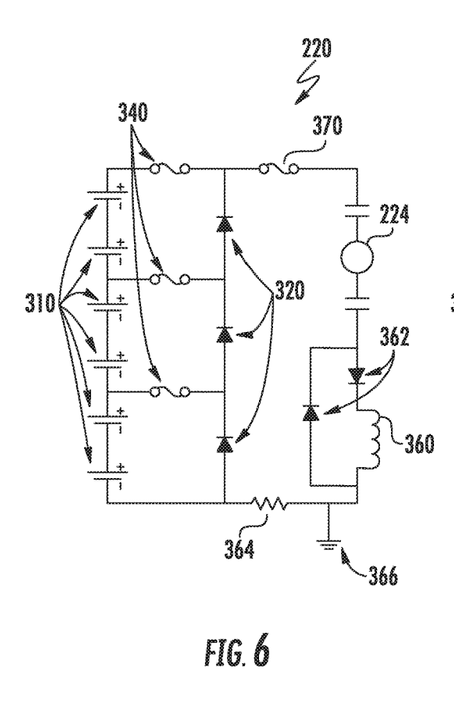
FIG. 6 depicts a blade pitch system according to example aspects of the present disclosure.

Referring now to FIG. 6, a blade pitch system 220 according to additional aspects of the present disclosure is depicted. Elements that are the same or similar to those as in FIGS. 3-5 are referred to with the same reference numerals. As shown, a bypass current device 320 can be coupled in parallel with a plurality of energy storage devices 310. For example, as shown, each bypass current device 320 (e.g., power diode) is coupled in parallel with two energy storage devices 310. A fuse 340 can be coupled between at least one energy storage device 310 and a bypass current device 320, as shown.

Figure 7:
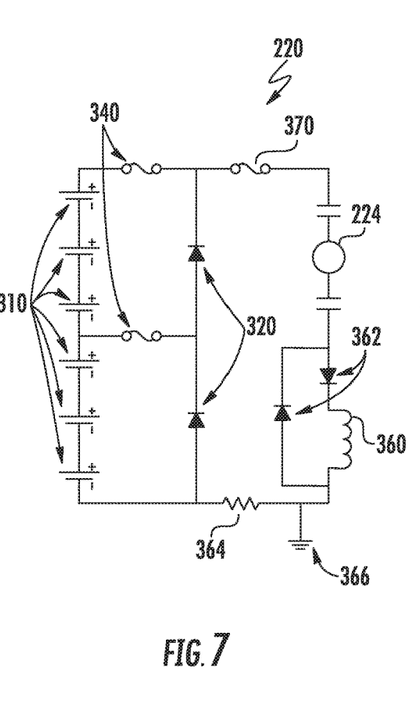
FIG. 7 depicts a blade pitch system according to example aspects of the present disclosure.

Referring now to FIG. 7, a blade pitch system 220 according to additional aspects of the present disclosure is depicted. Elements that are the same or similar to those as in FIGS. 3-6 are referred to with the same reference numerals. As shown, a bypass current device 320 can be coupled in parallel with a plurality of energy storage devices 310. For example, as shown, each bypass current device 320 (e.g., power diode) is coupled in parallel with three energy storage devices 310. A fuse 340 can be coupled between at least one energy storage device 310 and a bypass current device 320, as shown.

Figure 8:
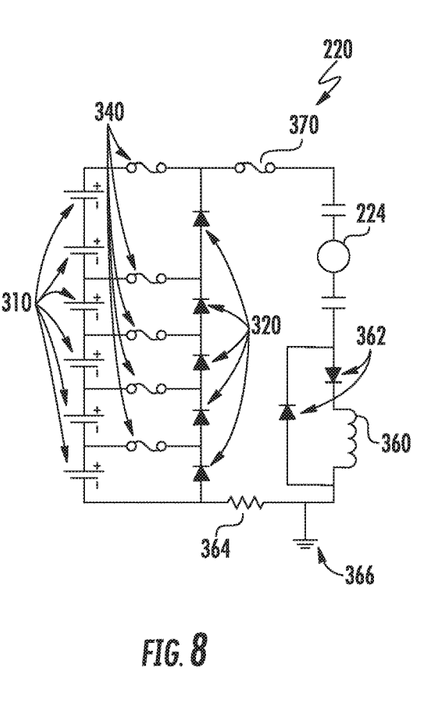
FIG. 8 depicts a blade pitch system according to example aspects of the present disclosure.

Referring now to FIG. 8, a blade pitch system 220 according to additional aspects of the present disclosure is depicted. Elements that are the same or similar to those as in FIGS. 3-7 are referred to with the same reference numerals. As shown, a single bypass current device 320 can be coupled in parallel with a plurality of energy storage devices 310. For example, as shown, one bypass current device 320 (e.g., power diode) is coupled in parallel with two energy storage devices 310, while the remaining energy storage devices 310 are each coupled in parallel with a corresponding bypass current device 320. A fuse 340 can be coupled between at least one energy storage device 310 and a bypass current device 320, as shown.

Figure 9:
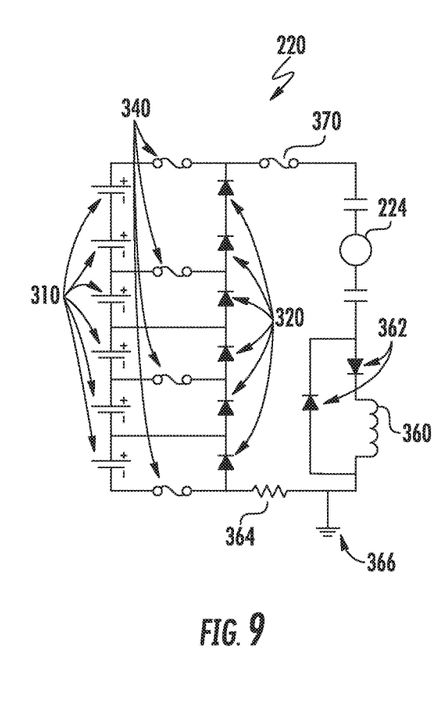
FIG. 9 depicts a blade pitch system according to example aspects of the present disclosure.

Referring now to FIG. 9, a blade pitch system 220 according to additional aspects of the present disclosure is depicted. Elements that are the same or similar to those as in FIGS. 3-8 are referred to with the same reference numerals. As shown, a bypass current device 320 (e.g., power diode) can be coupled in parallel with each energy storage device 310. A fuse 340 can be coupled between every other bypass current device 320 and at least one energy storage device 310, as shown, while the alternating bypass current devices can be directly coupled to a corresponding energy storage device 310.

Figure 10:
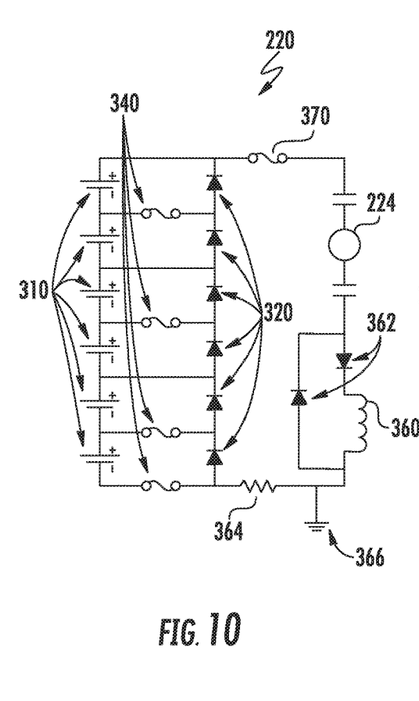
FIG. 10 depicts a blade pitch system according to example aspects of the present disclosure.

Referring now to FIG. 10, a blade pitch system 220 according to additional aspects of the present disclosure is depicted. Elements that are the same or similar to those as in FIGS. 3-9 are referred to with the same reference numerals. As shown, a bypass current device 320 (e.g., power diode) can be coupled in parallel with each energy storage device 310. A fuse 340 can be coupled between every other bypass current device 320 and at least one energy storage device 310, as shown, while the alternating bypass current devices can be directly coupled to a corresponding energy storage device 310.

Figure 11:
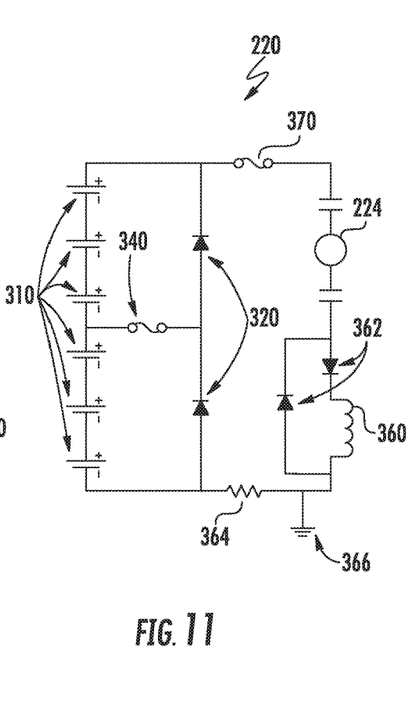
FIG. 11 depicts a blade pitch system according to example aspects of the present disclosure.

Referring now to FIG. 11, a blade pitch system 220 according to additional aspects of the present disclosure is depicted. Elements that are the same or similar to those as in FIGS. 3-10 are referred to with the same reference numerals. As shown, two bypass current devices 320 (e.g., power diodes) can each be coupled in parallel with a plurality (e.g., three) of energy storage devices 310. A single fuse 340 can be coupled between the two bypass current devices and two energy storage devices 310, as shown.

Figure 12:
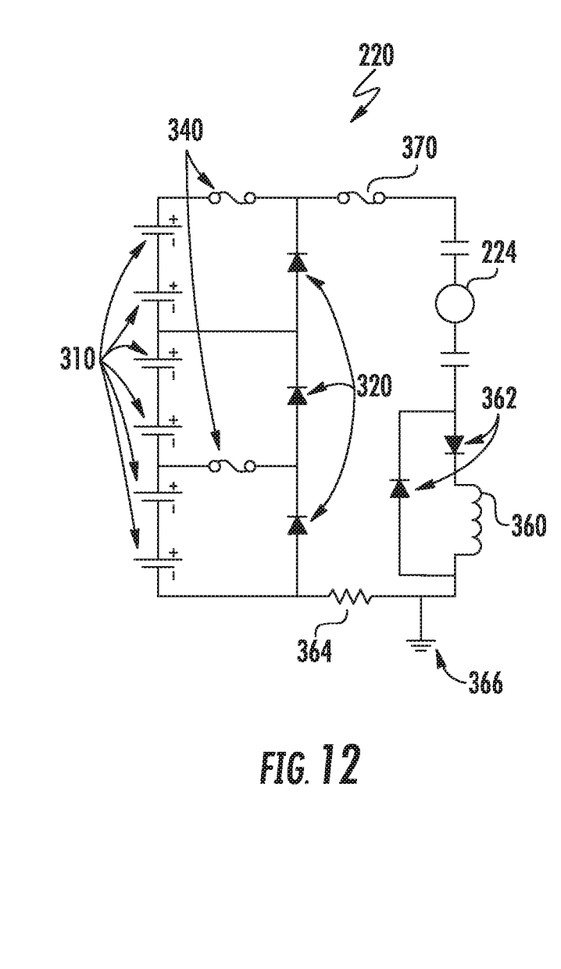
FIG. 12 depicts a blade pitch system according to example aspects of the present disclosure.

Referring now to FIG. 12, a blade pitch system 220 according to additional aspects of the present disclosure is depicted. Elements that are the same or similar to those as in FIGS. 3-11 are referred to with the same reference numerals. As shown, three bypass current devices 320 (e.g., power diodes) can each be coupled in parallel with a plurality (e.g., two) of energy storage devices 310. Two fuses 340 can be included to provide protection, as shown.

Figure 13:
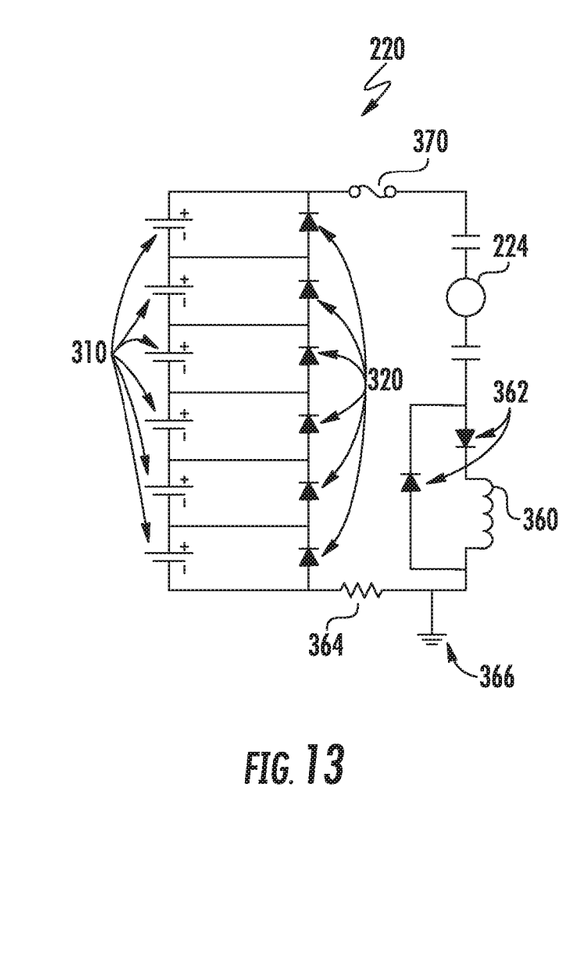
FIG. 13 depicts a blade pitch system according to example aspects of the present disclosure.

Referring now to FIG. 13, a blade pitch system 220 according to additional aspects of the present disclosure is depicted. Elements that are the same or similar to those as in FIGS. 3-12 are referred to with the same reference numerals. As shown, a bypass current device 320 (e.g., power diode) can be coupled in parallel with a single energy storage device 310. In the example blade pitch system 220 depicted in FIG. 13, no fuses 340 are included. In some implementations (not shown), each bypass current device 320 can be coupled in parallel with a plurality of energy storage devices 310.

Figure 14:
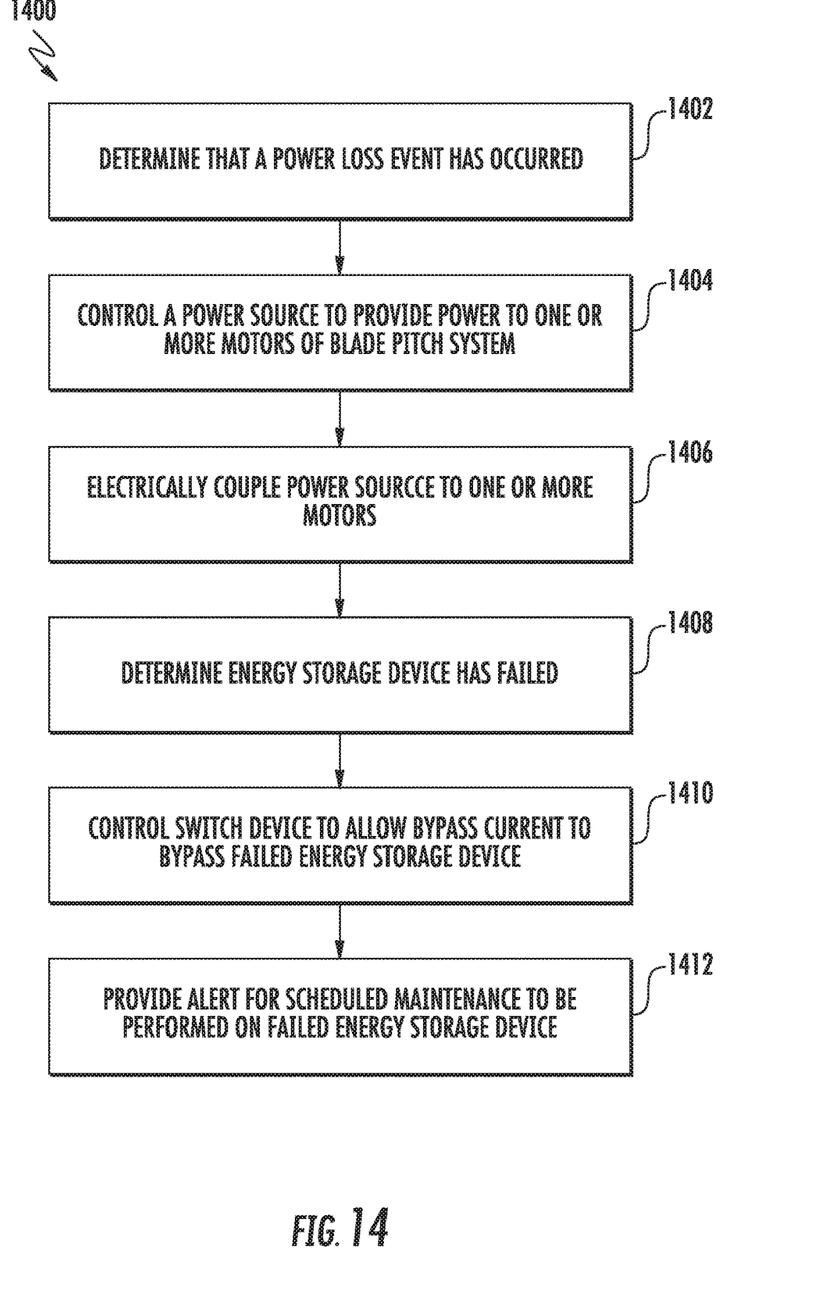
FIG. 14 depicts a flow diagram of a method according to example aspects of the present disclosure.

Referring now to FIG. 14, a flow diagram of an example method (1400) for providing power to one or more motors of a blade pitch system to pitch one or more blades of a wind turbine is depicted. A wind turbine 100 can include a plurality of blades 108. One or more motors 224 in a blade pitch system 220 can be configured to pitch the blades 108. Some or all of the steps in method 1400 can be implemented by a control device or control system, such as a control device 240 or control device/system 1510 depicted in FIGS. 2, 4, and 15. In addition, FIG. 14 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At (1402), a method (1400) can include determining that a power loss event has occurred. For example, a control device 240 can be configured to receive one or more signals from one or more sensors connected to an electrical grid 210. The control device 240 can be configured to determine that a grid disturbance has occurred by detecting a voltage or current anomaly of the electrical grid. For example, a grid disturbance can be a grid fault, and a control device 240 can determine that a grid disturbance has occurred when a voltage or current exceeds or drops below one or more thresholds. For example, when a voltage goes to zero, the control device can be configured to determine that a power loss event (e.g., a grid fault) has occurred. Similarly, a control device 240 can be configured to determine that a primary source of power for a blade pitch system 220 has failed. For example, a control device 240 can monitor a voltage and/or current from a primary power source.

At (1404), the method (1400) can include controlling a power source to provide power to one or more motors of the blade pitch system. For example, at (1406), a control device 240 can couple a power source 222 to one or more motors 224 by, for example, closing one or more switches in order to allow energy stored in the power source 222 to be provided to the one or more motors 224 in order to pitch one or more blades 108 of a wind turbine 100.

At (1408), the method (1400) can include determining that an energy storage device has failed. For example, a control device 240 can be configured to obtain one or more signals indicative of a voltage across a bypass current device 320 in a blade pitch system 220. The control device 240 can be configured to determine that an energy storage device 310 has failed based at least in part on the voltage across the bypass current device 320. For example, a voltage across a bypass current device 220 can drop below a threshold, or become negative. In such a case, the control device 240 can be configured to determine that an energy storage device 310 has failed.

In some implementations in which a switching device is used as a bypass current device 220, the control device 240 can further control a power source to provide power to one or more motors of the blade pitch system by, for example, at (1410), controlling the switching device to allow a bypass current to bypass the failed energy storage device 310. For example, a bypass current device 320 can be a MOSFET or IGBT switching device 380. A control device 240 can be configured to provide one or more switching commands to the MOSFET or IGBT switching device 380 to allow a bypass current to flow through the MOSFET or IGBT switching device 380 to bypass the failed energy storage device 310.

At (1412), the method (1400) can include providing an alert for scheduled maintenance to be performed on a failed energy storage device. For example, the control device 240 can be configured to provide an output to a computing system, a display, or other output which can alert a technician that an energy storage device 310 has failed. In some implementations, the specific failed energy storage device 310 can be identified. A technician can then replace the failed energy storage device 310.

In this way, the method (1400) can allow for providing power to one or more motors of a blade pitch system to pitch one or more blades of a wind turbine during a power loss event. Further, the method (1400) can allow for a bypass current device to be used to allow a bypass current to bypass one or more failed energy storage devices.

Figure 15:
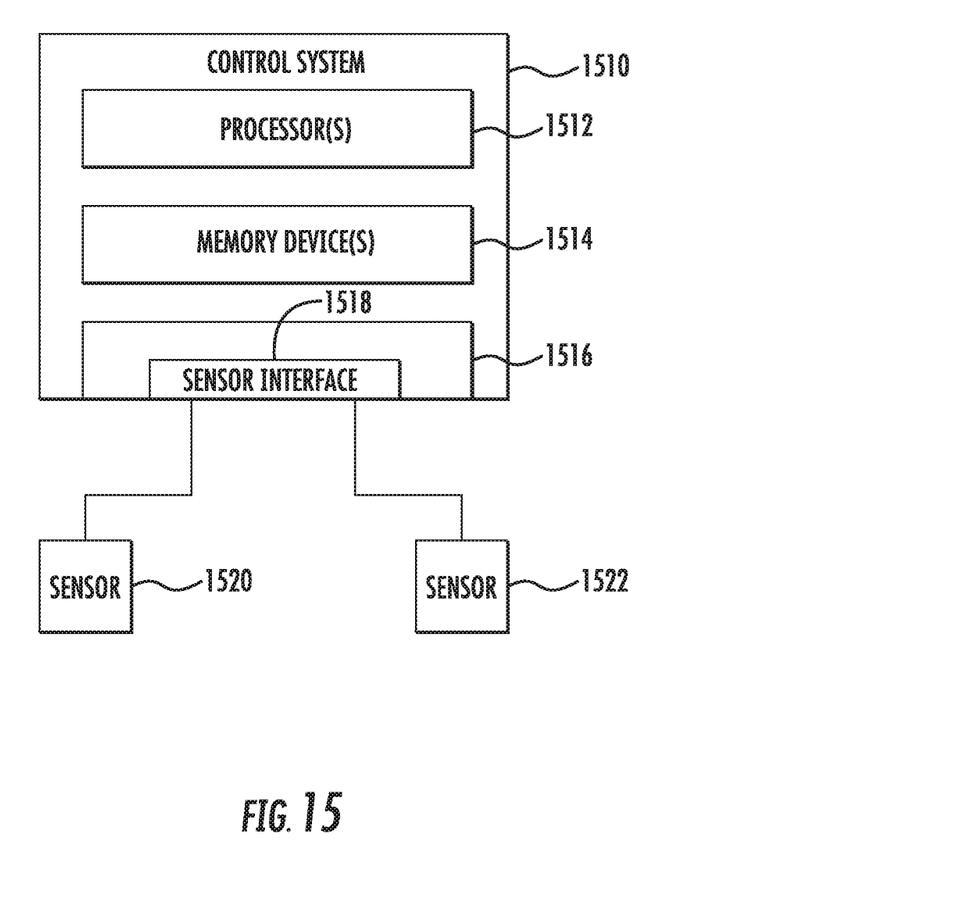
FIG. 15 depicts an example control device according to example aspects of the present disclosure.

Referring now to FIG. 15, an example control device/system 1510 according to example embodiments of the present disclosure is depicted. The control device/system 1510 can be used, for example, as control device 240 shown in FIGS. 2 and 4 and/or to implement any of the regulators or modules described herein. In some embodiments, the control device/system 1510 can include one or more processor(s) 1512 and one or more memory device(s) 1514. The processor(s) 1512 and memory device(s) 1514 can be distributed so that they are located at one more locales or with different devices.

The processor(s) 1512 and memory device(s) 1514 can be configured to perform a variety of computer-implemented functions and/or instructions (e.g., performing the methods, steps, calculations and the like and storing relevant data as disclosed herein). The instructions when executed by the processor(s) 1512 can cause the processor(s) 1512 to perform operations according to example aspects of the present disclosure. For instance, the instructions when executed by the processor(s) 1512 can cause the processor(s) 1512 to implement the method of FIG. 14 (1400) discussed herein.

Additionally, the control device 1510 can include a communication interface 1516 to facilitate communications between the control device 1510 and various components of a wind turbine system 200, blade pitch system 220, a wind farm, or electric grid 210, including power parameters, current parameters, voltage parameters, or other parameters described herein. Further, the communication interface 1518 can include a sensor interface 1518 (e.g., one or more analog-to-digital converters) to permit signals transmitted from one or more sensors 1520, 1522 to be converted into signals that can be understood and processed by the processor(s) 1512. It should be appreciated that the sensors (e.g. sensors 1520, 1522) can be communicatively coupled to the communications interface 1518 using any suitable means, such as a wired or wireless connection. The signals can be communicated using any suitable communications protocol. The sensors (1520, 1522) can be, for example, voltage sensors, current sensors, power sensors, or any other sensor device described herein.

As such, the processor(s) 1512 can be configured to receive one or more signals from the sensors 1520 and 1522.

For instance, in some embodiments, the processor(s) 1512 can receive signals indicative of a current from the sensor 1520. In some embodiments, the processor(s) 1512 can receive signals indicative of voltage (e.g. grid voltage, voltage across a bypass current device) from sensor 1522.

As used herein, the term "processor" refers not only to integrated circuits referred to in the art as being included in a computer, but also refers to a control device, a microcontrol device, a microcomputer, a programmable logic control device (PLC), an application specific integrated circuit, and other programmable circuits. Additionally, the memory device(s) 1514 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 1514 can generally be configured to store suitable computer-readable instructions that, when implemented by the processor(s) 1512, configure the control device 1510 to perform the various functions as described herein.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blade pitch system for a wind turbine, the wind turbine comprising one or more blades, the blade pitch system comprising: one or more motors configured to pitch the one or more blades of the wind turbine; and a power source comprising: a plurality of energy storage devices coupled in series, the plurality of energy storage devices configured to provide power to the one or more motors during a power loss event; and a plurality of bypass current devices, wherein a single one of each bypass current device is configured in parallel across one or more of the series energy storage devices to isolate and allow a bypass current around the isolated one or more of the series energy storage devices in parallel with the respective single bypass current device so that remaining ones of energy storage devices upstream and downstream of the isolated energy storage devices continue to provide power to the one or more motors; wherein current flows through only the single bypass current device to isolate the failed energy storage devices configured in parallel with the single bypass current device fails; and wherein the bypass current device comprises one of a diode, MOSFET switching device, or IGBT switching device.

2. The blade pitch system of claim 1, wherein each energy storage device comprises either a battery or a supercapacitor.

3. The blade pitch system of claim 1, further comprising: a control device configured to determine that at least one of the energy storage devices configured in parallel with the bypass current devices has failed.

4. The blade pitch system of claim 3, wherein the control device is configured to determine that the energy storage device has failed based at least in part on a voltage across the bypass current device.

5. The blade pitch system of claim 3, wherein the control device is further configured to provide an alert for scheduled maintenance to be performed on the failed energy storage device.

6. The blade pitch system of claim 1, wherein the bypass current device comprises a MOSFET or IGBT switching device; and wherein the control device is further configured to control the switching device to allow the bypass current to bypass the failed energy storage device.

7. The blade pitch system of claim 1, further comprising: a fuse coupled between at least one energy storage device in the plurality of energy storage devices and the at least one bypass current device; wherein the bypass current flows through the fuse.

8. The blade pitch system of claim 7, wherein the fuse is configured to protect against a short circuit in the bypass current device or an incorrectly installed bypass current device.

9. The blade pitch system of claim 1, further comprising: a plurality of fuses; wherein each fuse is coupled between at least one energy storage device and at least one bypass current device coupled in parallel with the at least one energy storage device.

10. A method for providing power to one or more motors of a blade pitch system to pitch one or more blades of a wind turbine, the method comprising: determining, by a control device, that a power loss event has occurred; causing, by the control device, a power source to be electrically coupled to the one or more motors, the power source comprising a plurality of energy storage devices coupled in series and a plurality of bypass current devices, wherein a single one of each bypass current device is coupled in parallel with at least one energy storage device; determining, by the control device, that an energy storage device has failed; controlling, by the control device, the single bypass current device in parallel with the failed energy storage device to isolate and allow a bypass current to bypass the failed energy storage device so that remaining ones of the energy storage devices upstream and downstream of the isolated energy storage device continue to provide power to the one or more motors, wherein current flows through only the single bypass current device when the energy storage device in parallel with the bypass current device has failed; and wherein the bypass current device comprises one of a diode, MOSFET switching device, or IGBT switching device.

11. The method of claim 10, wherein the bypass current device comprises a MOSFET or IGBT switching device; and wherein controlling, by the control device, the bypass current device to allow a bypass current to bypass the failed energy storage device to provide power to the one or more motors comprises controlling the MOSFET or IGBT switching device to allow the bypass current to bypass the failed energy storage device.

12. The method of claim 10, wherein determining, by a control device, that a power loss event has occurred comprises detecting, by the control device, a voltage or current anomaly of an electrical grid.

13. The method of claim 10, wherein determining, by the control device, that an energy storage device has failed comprises determining, by the control device, that an energy storage device has failed based at least in part on a voltage across the at least one bypass current device.

14. The method of claim 10, further comprising: providing an alert for scheduled maintenance to be performed on the failed energy storage device.

15. A wind turbine system, comprising: a wind turbine comprising one or more blades; and a blade pitch system, comprising: one or more motors configured to pitch the one or more blades; and a power source comprising: a plurality of energy storage devices coupled in series, the plurality of energy storage devices configured to provide power to the one or more motors during a power loss event; and a plurality of bypass current devices, wherein a single one of each bypass current device is configured in parallel across one or more of the series energy storage devices to isolate and allow a bypass current around the failed energy storage devices in parallel with the respective single bypass current device so that remaining ones of energy storage devices upstream and downstream of the isolated energy storage devices continue to provide power to the one or more motors; wherein current flows through only the single bypass current device when at least one of the energy storage devices configured in parallel with the single bypass current device fails; and wherein the at least one bypass current device comprises at least one diode, MOSFET switching device, or IGBT switching device.

16. The wind turbine system of claim 15, further comprising: a fuse coupled between at least one energy storage device in the plurality of energy storage devices and the at least one bypass current device; wherein the bypass current flows through the fuse.

17. The wind turbine system of claim 15, further comprising: a control device configured to determine that an energy storage device has failed.

* * * * *